United States Patent
Hamilton et al.

(10) Patent No.: US 12,255,462 B2
(45) Date of Patent: Mar. 18, 2025

(54) LINEARIZED-TRAJECTORY PREDICTIVE CONTROL FOR MICROGRID STABILITY

(71) Applicant: Schweitzer Engineering Laboratories, Inc., Pullman, WA (US)

(72) Inventors: Dakota Hamilton, West Lafayette, IN (US); Dionysios Aliprantis, West Lafayette, IN (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 539 days.

(21) Appl. No.: 17/575,702

(22) Filed: Jan. 14, 2022

(65) Prior Publication Data

US 2023/0231388 A1    Jul. 20, 2023

(51) Int. Cl.
  *H02J 3/38*    (2006.01)
  *G05B 15/02*   (2006.01)
  *H02J 13/00*   (2006.01)

(52) U.S. Cl.
  CPC ............. *H02J 3/381* (2013.01); *G05B 15/02* (2013.01); *H02J 13/00002* (2020.01); *H02J 2203/20* (2020.01); *H02J 2300/22* (2020.01); *H02J 2300/28* (2020.01)

(58) Field of Classification Search
  CPC ............ G05B 15/02; G05B 2219/2639; G05B 13/048; H02J 3/381; H02J 3/003; H02J 3/38; H02J 3/32; H02J 13/00002; H02J 2203/20; H02J 2300/10; H02J 2300/20; H02J 2300/22; H02J 2300/24; H02J 2300/28; H02J 2310/10
  See application file for complete search history.

(56) References Cited

U.S. PATENT DOCUMENTS

| | | | | |
|---|---|---|---|---|
| 8,097,981 | B2 * | 1/2012 | Shimada | H02M 7/797 307/66 |
| 8,498,752 | B2 * | 7/2013 | Wells | H02J 3/50 700/297 |
| 9,319,100 | B2 * | 4/2016 | Achanta | H04J 3/0638 |
| 9,400,491 | B2 * | 7/2016 | Kolinsky | G05B 5/01 |
| 10,074,978 | B2 * | 9/2018 | Geyer | H02J 3/1821 |
| 10,333,301 | B2 * | 6/2019 | Gubba Ravikumar | H02J 13/0004 |
| 10,333,308 | B2 * | 6/2019 | Guo | G06N 7/01 |
| 10,651,654 | B2 * | 5/2020 | Yi | H02J 3/38 |
| 10,756,543 | B2 * | 8/2020 | Detmers | H02J 3/32 |
| 10,826,324 | B2 * | 11/2020 | Dolezilek | H02J 13/00034 |
| 10,931,109 | B2 | 2/2021 | Cai | |

(Continued)

*Primary Examiner* — M. N. Von Buhr
(74) *Attorney, Agent, or Firm* — Fletcher Yoder, P.C.

(57) ABSTRACT

Techniques and apparatus presented herein are directed to improvements in maintaining voltage and frequency stability of an electric power delivery system. To do so, model predictive control (MPC) may be used. Input data may be obtained for a sampling period and may include a current system state. The MPC may predict an initial trajectory of the input data, output data, and a state of the system for a prediction period. The MPC may linearize the output and state trajectories and determine an updated input trajectory based at least in part on the linearized output trajectory. The MPC may determine control inputs to the system which achieve the updated input trajectory for a control period. The MPC may transmit control signals based at least in part on the control inputs to equipment associated with the input data.

20 Claims, 9 Drawing Sheets

(56) References Cited

U.S. PATENT DOCUMENTS

| | | |
|---|---|---|
| 10,958,101 B2 * | 3/2021 | Frame ............... H02J 13/00034 |
| 10,992,134 B2 | 4/2021 | Cai |
| 11,012,016 B2 | 5/2021 | Schweitzer, III |
| 11,018,523 B2 * | 5/2021 | Pavlovski ................. H02J 3/46 |
| 11,035,891 B1 | 6/2021 | Schweitzer, III |
| 11,038,352 B1 | 6/2021 | Khatib |
| 11,177,657 B1 | 11/2021 | Khatib |
| 11,368,024 B2 * | 6/2022 | Yeh ...................... G05B 13/048 |
| 11,982,544 B2 * | 5/2024 | Karlgaard ............ G01R 22/063 |
| 2017/0133845 A1 * | 5/2017 | Geyer ................. H02M 7/5395 |
| 2018/0262005 A1 * | 9/2018 | Lazaris .................... H02J 3/36 |
| 2019/0267807 A1 * | 8/2019 | Zweigle ............... G05B 13/048 |
| 2022/0149628 A1 * | 5/2022 | Kirschen ................ H02J 3/241 |
| 2022/0365137 A1 | 11/2022 | Manson |
| 2022/0368125 A1 | 11/2022 | Penberthy |
| 2023/0198260 A1 * | 6/2023 | Leitner ............... G06F 3/04817 |
| | | 700/291 |
| 2024/0088655 A1 * | 3/2024 | Pflaum ............. H02J 13/00002 |

\* cited by examiner

LINEARIZED-TRAJECTORY PREDICTIVE CONTROL FOR MICROGRID STABILITY

BACKGROUND

This disclosure relates to reliability of an electric power delivery system. More particularly, this disclosure relates to improving voltage and frequency stability of an electric power delivery system that may be affected by rapidly developing instabilities of the electric power delivery system.

A voltage and/or frequency of an electric power delivery system may become unstable due to many potential disturbances. Instabilities of the electric power delivery system may occur in a short period of time, such as a few seconds or less. These disturbances may be caused by, for example, a generator tripping, a fault in the power delivery system or a component of the delivery system, a large induction machine starting, and the like. A microgrid may refer to an electric power delivery system in, for example, an industrial facility. In some cases, the microgrid is not connected to a larger electrical power delivery grid.

Electric power delivery systems may use proportional-integral-derivative (PID) controllers in different control systems of the excitation and turbine systems of synchronous generation, through speed governors, automatic voltage regulators (AVRs), and power system stabilizers (PSS). The PID controllers may measure system voltages and frequencies. The PID controllers are used to react to the measurements and adjust the excitation and turbine controls based on the measurements. The PID controllers are localized such that each PID controller obtains measurements (e.g., voltage, speed, and/or frequency) for a particular generator and/or load. That is, the PID based systems react to deviations in voltage and frequency from a given point of reference.

Further, the PID controllers may be difficult to tune for a broad range of disturbances, which may increase engineering costs. Improper (e.g., poor) tuning of the PIDs may also increase the short-term instability of the microgrid. Problems with the techniques using PID controllers may be exacerbated by lower inertia (e.g., faster changes in system voltage and/or frequency within the microgrid) and higher resistance-to-reactance ratios of microgrids compared to larger power delivery grids.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION

Figure 1:
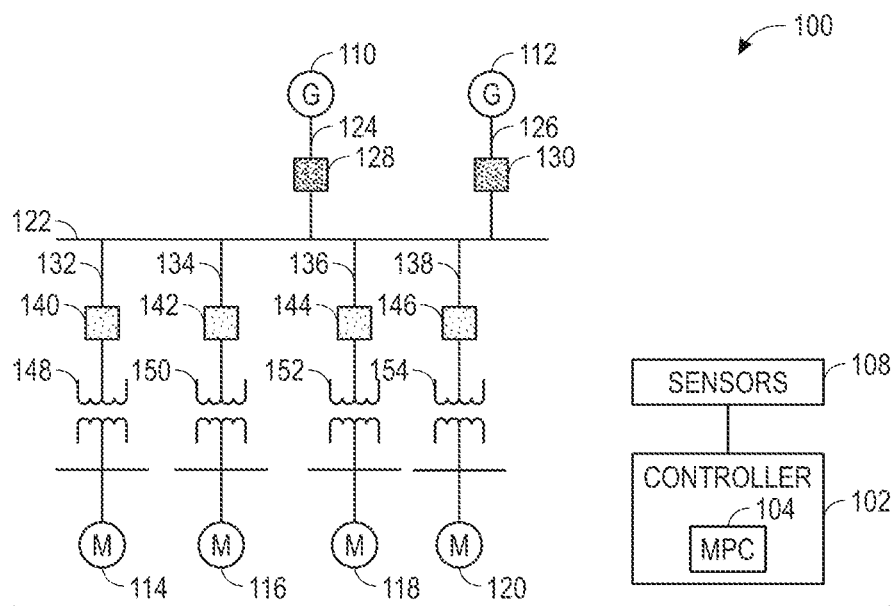
FIG. 1 is a schematic diagram of an electric power delivery system, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

In addition, several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Thus, embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

As discussed above, stability of a microgrid may be affected by numerous contingencies such as tripping of generation and load, faults in the power network or individual components, and the starting up of large induction machines. Conventional power delivery systems may use proportional-integral-derivative (PID) controllers and feedback loops to address stability issues occurring in a time period of a few seconds or less (e.g., less than three seconds, less than two seconds, and/or less than one second) (i.e., short-term stability). The PID controllers may measure parameters of the power delivery system and react to those measurements by adjusting excitation and turbine controls to change the output (e.g., voltage, frequency, and the like) of the power delivery system. However, the lower inertia and higher resistance-to-reactance ratios of conductors in a microgrid tend to worsen these instabilities.

Embodiments herein present control strategies to overcome the increased short-term instabilities of a microgrid. For example, embodiments presented herein may be based on a centralized model predictive control (MPC) for microgrid stability. The MPC predicts a change of a state of the power delivery system for a finite time period (e.g., a prediction period) based on a dynamic model. To do so, a centralized controller may obtain input data from various components of the power delivery system. The MPC may apply a trajectory linearization technique that separates nonlinear power system dynamics from adjustments of control input data. The MPC utilizes a mathematical model of dynamics of the power delivery system to predict development of future states and outputs of the system for the finite time period.

For example, the MPC may obtain system state data and perform calculations at a number $N_p$ of time steps which may occur every $T_s$ seconds. In some embodiments, each time step k may be, for example, in a range of about 20 milliseconds and about 100 milliseconds, such as about 50 milliseconds or about 75 milliseconds. In some cases, the time step k may be less than 500 milliseconds. Based on the prediction, the MPC computes control inputs for the system over a control horizon having a number $N_c$ of time steps. In some embodiments, an end of the control horizon may be the same as an end of the prediction horizon. In that case, a control input is computed for each step $N_c$ of the control period. In some embodiments, the control period may be shorter than the prediction period. In that case, a number of variables, and thus a time to perform various calculations herein, may be reduced. In this way, a shorter sampling period (e.g., $T_s$) for each time step may reduce a number of variables and thus increase a speed of the calculations, thereby improving an efficiency and a performance of the MPC and the overall power delivery system. Alternatively, in some cases, the computational budget (e.g., computational resources to perform the calculations) may be maintained by reducing the sampling period with a reduced number of variables (e.g., time steps) without changing a length of the prediction horizon.

The power system model may be represented by the following nonlinear differential algebraic equations:

$$\dot{x}(t)=f(x(t),u(t),I_{qd}(t)) \quad (1)$$

$$I_{qd}(t)=g(x(t)) \quad (2)$$

$$y(t)=h(x(t),I_{qd}(t)) \quad (3)$$

where $x(t)\in \mathbb{R}^n$ is a column vector of system states of the power delivery system, $u(t)\in \mathbb{R}^m$ is a vector of control inputs of the power delivery system, $I_{qd}(t)\in \mathbb{R}^{2r}$ is a column vector of qd-axis stator currents in individual rotor reference frames injected into a network of the power delivery system by r rotating machines, and y is a column vector of the outputs of the power delivery system which are tracked via the controller. The vector-valued function f represents the nonlinear differential equations associated with the system state dynamics. The function g represents algebraic network equations and reference frame transformations, and the function h represents algebraic system output equations. An assumption may be made that there is no direct feedthrough from input to output. These equations are the basis of the MPC and are discussed in more detail below. In some cases, an ordinary differential equation (ODE) solver may be used to obtain a continuous-time solution to the nonlinear differential-algebraic Equations (1)-(3).

The MPC may sample the power delivery system and initiates calculations every $T_s$ seconds. At each time step k, the MPC may predict system states $x_k^*$ and outputs $y_k^*$ over the prediction horizon for a $N_p$ time steps. A control input (e.g., an optimal control input, u(t)) may be computed over a control horizon of $N_c$ time steps based on the predicted system states $x_k^*$ and outputs $y_k^*$. It should be noted that an asterisk (e.g., $x_k^*$, $y_k^*$, and $I_{qd,k}^*$) may be used to denote variables that are predicted by, for example, simulation.

Various delays may be caused by various operations executed by the power delivery system and/or the computations and communications of the MPC. These delays may be caused by, for example, measuring values such as voltage or current, performing calculations such as those discussed herein, updating network topology of the power delivery system, and/or communication between components of the power delivery system. In some cases, these delays may affect (e.g., increase and/or decrease) instabilities of the power delivery system. A worst case scenario of a sum of these delays may be denoted as $\tau_{delay}$.

The MPC may account for these delays using a delay period of $N_d \geq 1$ time steps, where $N_d T_s \geq \tau_{delay}$. Thus, an optimization of the MPC that begins at time $t_0$ may include decision variables starting at $t_0 + N_d T_s$ and may maintain preceding control inputs at an initial value (e.g., obtained from a previous optimization of the MPC at a previous time step, $t_0 - T_s$). To reduce a number of decision variable used by the MPC during computations, a length of the control horizon may be reduced (e.g., $N_c < N_p - N_d$). The MPC may compute the control input u(t) for each time step $N_c$ of the control horizon.

In some cases, the MPC may receive updates of the network topology from, for example, protective equipment in the network. For example, a protective relay may send a signal to the MPC to indicate that that relay cleared a fault by opening a line. The signal received by the MPC may indicate the open line. The MPC may account for a communication delay of the signal, as discussed above.

The MPC may begin calculating control inputs after the delay period. Thus, rather than the first calculation being performed at a first time step k, the MPC may perform the first calculation at time step $k+N_d$. In that case, the MPC may not calculate and/or change control inputs for time steps preceding the time step $k+N_d$. In this way, the MPC accounts for delays within the power delivery system and ensures control actions based on the control inputs are performed as needed to maintain or improve stability of the system and/or microgrid.

FIG. 1 is a schematic diagram of an electric power delivery system 100, in accordance with an embodiment of the present disclosure. The electric power delivery system 100 may transmit power from generation to load using the depicted components. The electric power delivery system 100 may include may include generators 110, 112 and loads 114, 116, 118, 120. Although the loads 114, 116, 118, 120 are illustrated as motor loads, it should be understood that the system 100 may include and be coupled to various other types of loads, such as electrical equipment in an industrial plant. The generators 110, 112 may generate power including active power and reactive power. Moreover, the loads 114, 116, 118, 120 may consume the generated active power and the generated reactive power.

The generators 110, 112 may be connected to a bus 122 via respective lines 124, 126 (e.g., transmission lines and/or medium voltage lines) and via circuit breakers 128, 130. The circuit breakers 128, 130 may be positioned on the respective lines 124, 126. Moreover, the loads 114, 116, 118, 120 may be connected to the bus 122 via respective lines 132, 134, 136, 138 and through circuit breakers 140, 142, 144, 146, and transformers 148, 150, 152, 154. The circuit breakers 140, 142, 144, 146 and transformers 148, 150, 152, 154 may be coupled to the respective lines 132, 134, 136, 138.

The electric power delivery system 100 may include a controller 102 coupled to one or more sensors 108. In some embodiments, the controller 102 may include a model predictive control (MPC) 104 and may be a centralized controller for the system 100. The one or more sensors 108 may obtain information related to the components of the electric power delivery system 100, including the generators 110, 112, the loads 114, 116, 118, 120, the circuit breakers 140, 142, 144, 146, the transformers 148, 150, 152, 154, or any combination thereof. The controller 102 may monitor and control the power transmission of the electric power delivery system 100.

As such, the controller 102 may receive one or more electrical measurements and/or measurements related to mechanical variables such as a generator rotor speed or angle, from the one or more sensors 108. The sensors 108 may be proximate to the components of the power delivery system 100 and remote from the controller 102. The controller 102 may also send control signals to the one or more components of the electric power delivery system 100 to control power transmission from generation to load (e.g., power flow). While two generators 110, 112 and four loads 114, 116, 118, 120 are depicted, it should be understood that the electric power delivery system may include more or fewer components than those shown.

In some embodiments, the controller 102 may open or close each of the circuit breakers 128, 130, 140, 142, 144, 146 to control the power (active and/or reactive) generation and consumption of the electric power delivery system 100. For example, during overcurrent conditions, the controller 102 may generate and transmit control signals to trip (open) one or more of the circuit breakers 128, 130, 140, 142, 144, 146 to disconnect the generators 110, 112 or the loads 114, 116, 118, 120. In specific embodiments, the controller 102 may generate and transmit such signals based on receiving inputs from the transformers 148, 150, 152, 154.

In some cases, the transformers 148, 150, 152, 154 may be current transformers and may provide measurement of current flow through the respective lines 132, 134, 136, 138 to the controller 102. The controller 102 may use such current flow measurements to open or close one or more of the circuit breakers 140, 142, 144, 146 associated with the loads 114, 116, 118, 120 or circuit breakers 128, 130 associated with the generators 110, 112. For example, the controller 102 may trip a circuit breaker (e.g., circuit breaker 140, 142, 144, 146) associated with a respective load (e.g., load 114, 116, 118, 120) with high current measurements to prevent overloading the respective load. Similarly, the controller 102 may also open or close one or more of the circuit breakers 128, 130 associated with one or more generators 110, 112 to prevent overloading different components of the electric power delivery system 100.

Moreover, the controller 102 may receive measurements indicative of power (active and/or reactive) generated by the generators 110, 112 and power delivered to the loads 114, 116, 118, 120. In some embodiments, the controller 102 may receive current measurements or voltage measurements of different components and translate such measurements to power measurements. Subsequently, the controller 102 may provide the control signals to respective controllers (e.g., governors, exciters) of one or more of the generators 110, 112 or controllers of one or more loads 114, 116, 118, 120 to adjust (e.g., increase and/or decrease) the power generation and the power consumption of the electric power delivery system 100.

Figure 2:
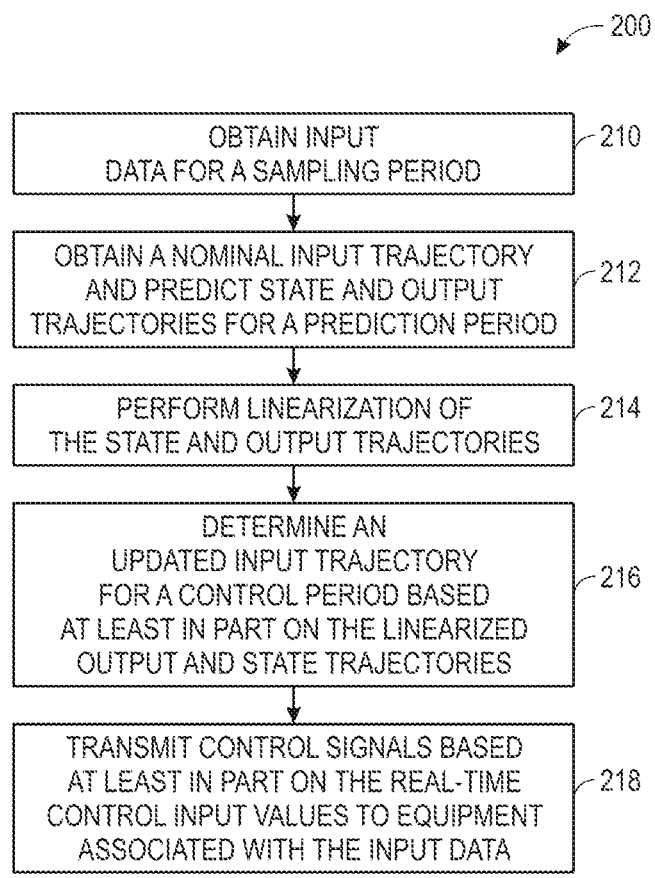
FIG. 2 is a flowchart depicting operations for modeling an electric power delivery system and adjusting control inputs based on the model to improve or maintain stability of the electric power delivery system, according to an embodiment of the present disclosure.

FIG. 2 is a flowchart depicting operations 200 for modeling an electric power delivery system and adjusting control inputs based on the model to improve or maintain stability of the electric power delivery system, according to an embodiment of the present disclosure. In some embodiments, the operations 200 may be performed by one or more processor and/or controllers, such as the controller 102 of the system 100 discussed with respect to FIG. 1. It should be understood that, while the operations 200 are shown in a specific sequence, the operations 200 may be implemented in any suitable order, and at least some operations 200 may be skipped altogether.

The operations 200 begins at operation 210 where input data for the system 100 is obtained for a particular sampling period. The input data may be measured by one or more sensors 108 disposed proximate to an associated component of the system 100. The input data may include a state of a system 100, a voltage, a frequency, a rotor speed, a mechanical load torque, or any combination thereof. It should be noted that some of the input data may be computed based on other input data. For example, mechanical load torque may be calculated based on the rotor speed of an electric motor. The sampling period may occur at a regular interval and may have a duration that changes based on the input and/or output of the model predictive control (MPC). In some embodiments, the input data may include information associated with one or more loads of the associated microgrid.

At operation 212, the controller 102 may obtain a nominal input trajectory and predict a state trajectory for (e.g., over) a prediction period (e.g., a prediction horizon). The nominal input trajectory over the prediction horizon may be a staircase signal represented as:

$$u^*(t) = u_k^* \quad (4)$$

where $t_0 + kT_s \leq t < t_0 + (k+1)T_s$, $\forall k \in \{0, 1, \ldots, N_p - 1\}$. The system state $x_k^*$, the output $y_k^*$, and qd currents $I_{qd,k}^*$ may be obtained by evaluation of the continuous-time solution (e.g., obtained via an ODE solver) at time $t_0 + kT_s$ for each discrete time step k of the prediction horizon.

At operation 214, the MPC may obtain an input trajectory and predict a state trajectory for a prediction period (e.g., a prediction horizon). As discussed above, the continuous-time solution for each time step of the prediction period may be evaluated, via, for example, a simulation. That is, Jacobian matrices are evaluated at $x_k^*$, $y_k^*$, and $I_{qd,k}^*$. Thus, Jacobian matrix elements may correspond to nonlinear terms recalculated for each time step k resulting in a linear state-space equation for the perturbed system dynamics for each time step k of the prediction horizon represented as:

$$\frac{d}{dt}\delta x(t) = A_k \delta x(t) + B_k \delta u(t), \quad (5)$$

$$\delta y(t) = C_k \delta x(t), \quad (6)$$

where δ denotes a perturbation (e.g., a change) in the respective variable, and $$A_k = \frac{\partial f}{\partial x} + \frac{\partial f}{\partial I_{qd}} \frac{\partial g}{\partial x}, B_k = \frac{\partial f}{\partial u}, C_k = \frac{\partial h}{\partial x} + \frac{\partial h}{\partial I_{qd}} \frac{\partial g}{\partial x}. \quad (7)$$

The MPC may discretize the continuous-time Equations (5)-(6) to obtain:

$$\delta x_k = \Phi_{k-1} \delta x_{k-1} + \Gamma_{k-1} \delta u_{k-1}, \delta x_0 = 0. \quad (8)$$

$$\delta y_k = C_k \delta x_k, \quad (9)$$

where $\Phi_k = e^{A_k T_s}$ and $\Gamma_k = \int_0^{T_s} e^{A_k \eta} B_k d\eta$, for all $k \in \{1, \ldots, N_p\}$. By recursively applying Equations (8)-(9), perturbed system outputs may be written for each time step of the prediction period as a function of changes to the control input. Thus, the decision variables of the MPC are the perturbed control inputs:

$$\delta U = \begin{bmatrix} \delta u_{N_d}^\top & \delta u_{N_d+1}^\top & \ldots & \delta u_{N_d+N_c-1}^\top \end{bmatrix}^\top \in \mathbb{R}^{mN_c}. \quad (10)$$

Manipulating the algebraic equations, a linear map between input and output perturbations may be obtained:

$$\delta Y = \begin{bmatrix} \delta y_{N_d+1}^\top & \delta y_{N_d+2}^\top & \ldots & \delta y_{N_p}^\top \end{bmatrix}^\top = Z \delta U, \quad (11)$$

where $\delta Y \in \mathbb{R}^{p(N_p - N_d)}$, and Z is a block lower-triangular matrix. That is, the system dynamics may be linearized about each point (e.g., time step, k) of the state and output trajectories at operation 214.

Linearization of the state trajectory and/or output trajectory enables the MPC to linearize the output trajectory at each point (e.g., time step) and reduce a complexity of the output (and state) trajectories. In this way, the MPC may improve an efficiency of the techniques described herein and improve a functioning of the MPC itself. Equation (8) represents how a change in either the control inputs (u) or system states (x) at the given time step k−1 impacts the change in system state (x) at the next time step (e.g., k). Equation (9) represents a change in system outputs (y) due to a change in the control inputs (u) or system states (x) for the given time step k.

At operation 216, the MPC determines an input trajectory (u) for the prediction period based at least in part on the linearized output trajectory and state trajectory based on Equations (12)-(16) below. The input trajectory u may be determined by minimizing Equation (12) subject to the constraints of Equations (13)-(16). That is, after the output and state trajectories are linearized, the MPC may determine a change in the output trajectory (δy) in terms of a change in the input trajectory (du), for example, using Equation (11). The MPC may use this relationship in Equation (13) to solve Equations (12)-(16). Further, a first control input (u) that will affect the system output (y) occurs at $N_d$, which occurs sometime after the first time step (e.g., k=1).

The MPC may have two objectives: (1) maintain the output as close as possible to desired reference outputs and (2) return the system to a steady-state operating point as quickly as possible. These objections may be represented using the following objective function:

$$\min_{\delta U, U, Y} J = \quad (12)$$

$$\frac{1}{2}(Y_{ref} - Y)^T Q(Y_{ref} - Y) + \frac{1}{2}(H_1 U)^T V_1(H_1 U) + \frac{1}{2}(H_2 \delta U)^T V_2(H_2 \delta U)$$

such that $$Y = Y^* + Z \delta U, \quad (13)$$

$$U = U^* + \delta U \quad (14)$$

$$\tilde{A}_{in} U \leq \tilde{b}_{in}, \quad (15)$$

$$U_{min} \leq U \leq U_{max}, \quad (16)$$

where $$H_1 = \begin{bmatrix} -\mathbb{1}_m & \mathbb{1}_m & & \\ & \ddots & \ddots & \\ & & -\mathbb{1}_m & \mathbb{1}_m \end{bmatrix}, H_2 = [\mathbb{1}_m \ 0 \ \ldots \ 0], \quad (17)$$

and Y, Y*, $Y_{ref}$, U, U*, $U_{min}$, and $U_{max}$ are defined similarly to δY and δU of Equations (10) and (11) above.

The first term in Equation (12) ($\frac{1}{2}(Y_{ref}-Y)^T Q(Y_{ref}-Y)$) may penalize deviations between system outputs and reference values, and thus is a key aspect in stabilizing the system during a transient. The second term ($\frac{1}{2}(H_1U)^T V_1(H_1U)$) and the third term ($\frac{1}{2}(H_2\delta U)^T V_2(H_2\delta U)$) in Equation (12) may be auxiliary terms and help to reduce oscillations in the decision variables once the system gets close to a steady-state. The second term of Equation (12) may penalize changes in control between consecutive time steps while the third term of Equation (12) is equal to $$(1/2)\delta u_{N_d}^T V_2 \delta u_{N_d}.$$

A combined effect of the second and third terms at the steady-state is that $u_k = u_{N_d}^*$ for all $k \geq N_d$. The weight matrices Q, $V_1$, and $V_2$ are diagonal and positive definite. In general, the elements of matrix Q should be chosen such that the first term dominates at the beginning of a transient. The constraints of Equations (15) and (16) may capture limits imposed by the control systems.

The objective function of Equation (12) may be re-written as a standard quadratic program equation:

$$\min_{\delta U} J = \frac{1}{2} \delta U^\top P \delta U + q^\top \delta U + c \quad (18)$$

such that $$A_{in}\delta U \leq b_{in}, \quad (19)$$

$$U_{min} - U^* \leq \delta U \leq U_{max} - U^*, \quad (20)$$

where $$P = Z^T Q Z + H_1^T V_1 H_1 + H_2^T V_2 H_2, \quad (21)$$

$$g = -Z^T Q(Y_{ref} - Y^*) + H_1^T V_1 H_1 U^*, \quad (22)$$

$$c = \frac{1}{2}[(Y_{ref} - Y^*)^T Q(Y_{ref} - Y^*) + (H_1 U^*)^T V_1(H_1 U^*)]. \quad (23)$$

Equation (18) is convex, and thus has a unique solution, if and only if, P≻ 0. This solution can be verified by re-writing Equation (21) as $$P = Z^T Q Z + H^T V H, \quad (24)$$

where $H^T = [H_2^T \ H_1^T]$ and V=blockdiag($V_2, V_1$). Since V≻ 0 and H has a full column rank, $H^T V H \succ 0$. Additionally, $Z^T Q Z \succeq 0$ because Q≻ 0. Therefore, P≻ 0. Thus, the second and third terms of Equation (12) also ensure a unique solution to Equation (18), regardless of the rank of Z.

At operation 218, the MPC may transmit control signals to components and/or equipment of the power delivery system based at least in part on the real-time control input values calculated at operation 216. That is, the change in the input trajectory (e.g., u) may be added to the nominal input trajectory u* to obtain a computed (e.g., "optimal"—acceptable, good, better, or best) input trajectory (e.g., u*+δu). The control signals transmitted to the power delivery system may be based at least in part on the computed input trajectory.

In some embodiments, the MPC may perform the operations 200 for each time step k (e.g., sampling period). That is, the MPC may obtain the input data, predict the nominal input trajectory, output trajectory and state trajectory, determine the updated input trajectory, determine real-time input data, and transmit the control signals based at least in part on the real-time input values, all within the time step. In some cases, the MPC may perform the operations 200 in a time period that is less than the time step k. In some embodiments, a remainder of the computed input trajectory for the current sampling period may be used as the initial predicted input trajectory for the next sampling period.

Figure 3:
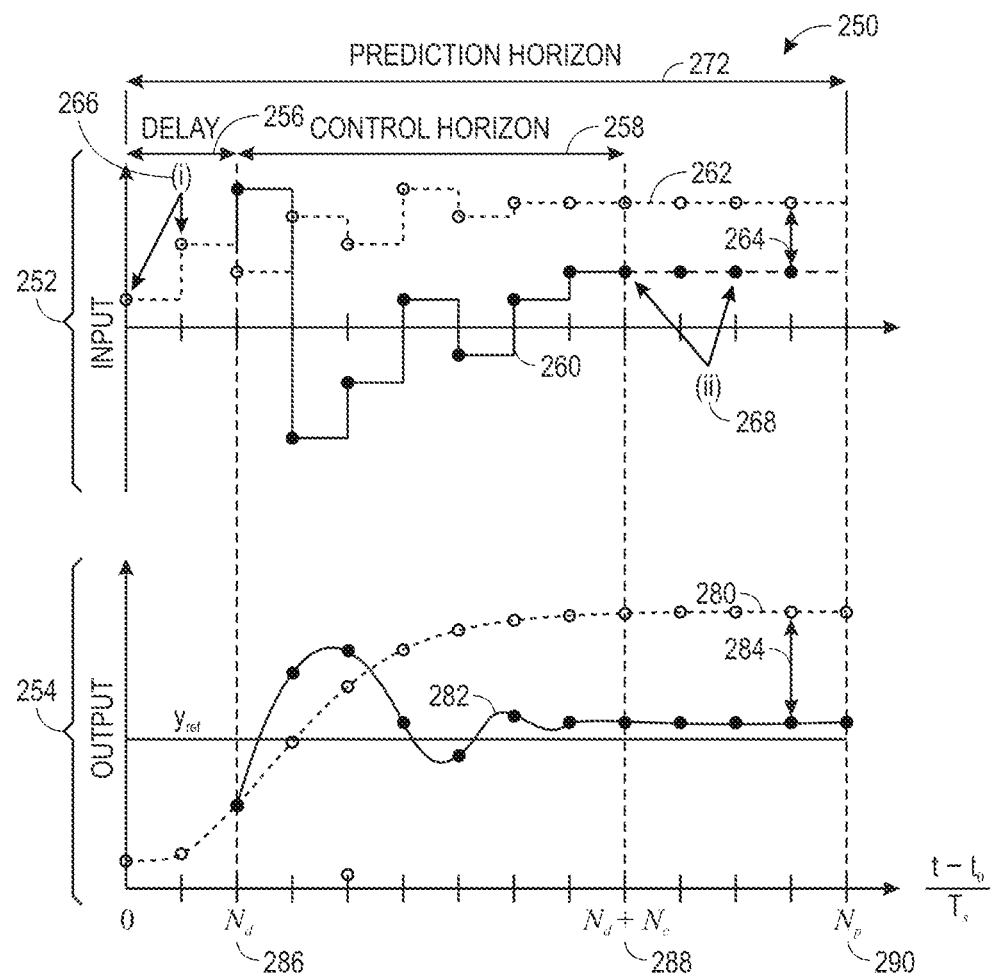
FIG. 3 is a graph illustrating a trajectory linearization process of a model predictive control (MPC), according to an embodiment of the present disclosure.

FIG. 3 is a graph 250 illustrating a trajectory linearization process of a model predictive control (MPC), according to an embodiment of the present disclosure. Specifically, input data u and output data y of a model predictive control (MPC) scheme and respective nominal input trajectory $u_k^*$ 262, predicted output trajectory $y_k^*$ 280, optimal input trajectory $u_k$ 260, and optimal output trajectory $y_k$ 282. A first portion 252 of the graph 250 illustrates the nominal input trajectory $u_k^*$ 262 and corresponding optimal input trajectory $u_k$ 260. The points 266 of the nominal input trajectory $u_k^*$ 262 during the delay period 256 may represented by $\delta u_k = 0$, $\forall k < N_d$. The points 268 of the optimal input trajectory $u_k$ 260 after the control period 258 may be represented by $u_k = u_{N_d + N_c - 1}$, $\forall k \geq N_d + N_c$.

A second portion 254 of the graph 250 illustrates the predicted output trajectory $y_k^*$ 280 and the corresponding optimal output trajectory $y_k$ 282. As shown, the graph of the 250 includes a delay period 256 ranging from time step k=0 to time step $k=N_d$ 286 and a control period 258 (e.g., control horizon) ranging from the time step $k=N_d$ 286 to the time step $k=N_d+N_c$ 288. A prediction period 272 (e.g., prediction horizon) for the delivery system 100 may have a duration from time step k=0 to the time step $k=N_p$ 290.

As discussed above, the nominal input trajectory $u_k^*$ 262 may be obtained by the MPC based on the input data and may be used to compute the optimal input trajectory $u_k$ 260. The predicted output trajectory $y_k^*$ 280 may be determined by solving the nonlinear ordinary differential Equations (1)-(3) above. After the output trajectory $y_k^*$ 280 and the state trajectory x* are linearized as discussed with respect to operation 214 of FIG. 2, a change in the input trajectory δu 264 may be linearly mapped to a change in the output trajectory δy 284 as discussed above. In this way, the MPC may determine control inputs u to obtain the optimal output trajectory $y_k$ 282.

As discussed above, two functions, among others, of the MPC may be to (1) maintain the output as close as possible to desired reference outputs and (2) return the system to a steady-state operating point as quickly as possible. The first function is illustrated in the second portion 254 of FIG. 3 by the change in the output trajectory δy 284 showing that the predicted output trajectory $y_k^*$ 280 is substantially similar to the corresponding optimal output trajectory $y_k$ 282. Similarly, the second function of the MPC may be represented in the first portion 252 of FIG. 3 by the points 268 showing that the optimal control input trajectory $u_k$ 260 returns to a steady state relatively quickly after the control period 258.

Figure 4:
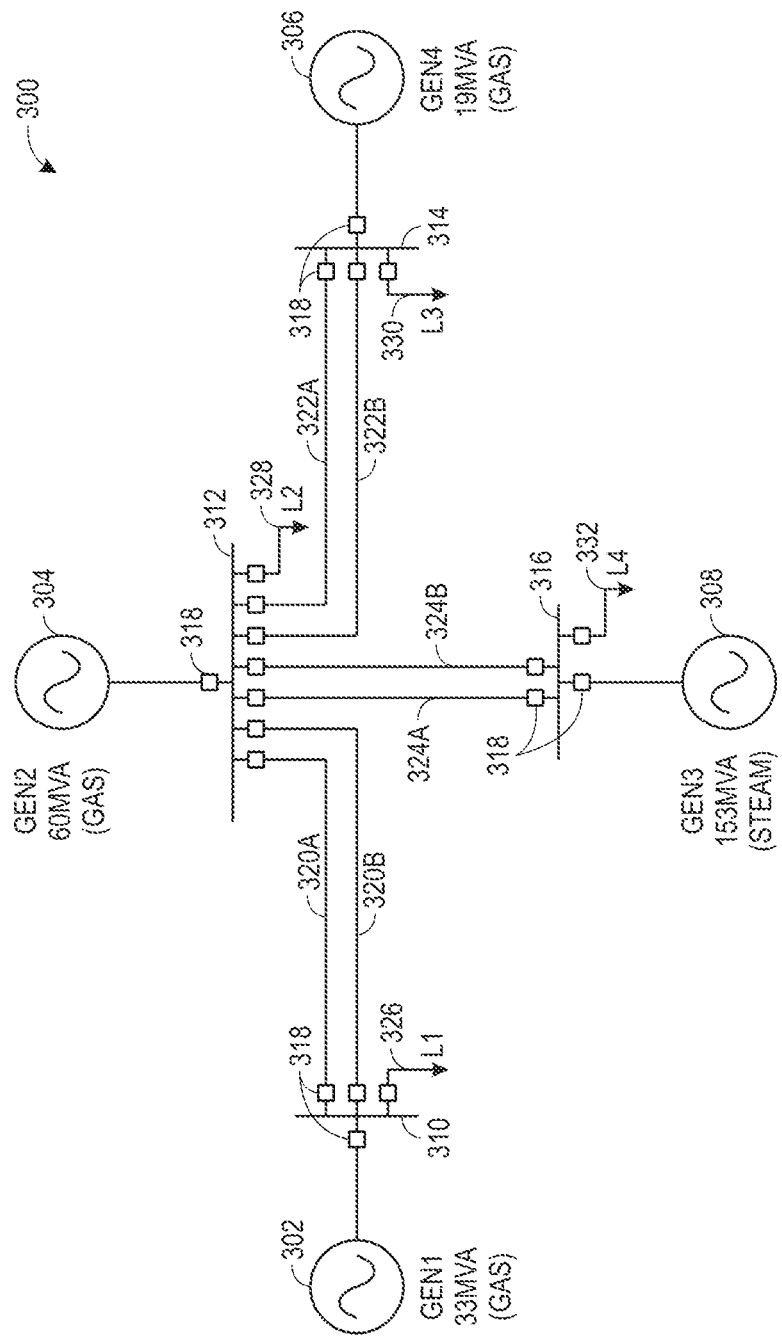
FIG. 4 is a schematic diagram of an example microgrid, according to an embodiment of the present disclosure.

FIG. 4 is a schematic diagram of an example microgrid 300 (e.g., electric power delivery system), according to an embodiment of the present disclosure. The example microgrid 300 may correspond to the electric power delivery system 100 of FIG. 1. As shown, the microgrid 300 includes a number of synchronous generators 302, 304, 306, 308 coupled to busses 310, 312, 314, 316 via components 318, such as circuit breakers and lines 320A, 320B, 322A, 322B, 324A, and 324B. Each synchronous generator 302, 304, 306, 308 consists of a synchronous machine with a field winding voltage controlled by a brushless exciter and mechanical torque controlled by either a gas or steam-driven turbine. As shown, a first synchronous generator 302 is a 33 MVA gas generator, a second synchronous generator 304 is a 60 MVA gas generator, a third synchronous generator 308 is a 153 MVA steam generator and a fourth synchronous generator 306 is a 19 MVA gas generator. It should be understood that the generators in FIG. 4 are merely examples and any type and/or combination of generators may be present in the microgrid 300.

The busses 310, 312, 314, 316 may be interconnected via one or more components 318, such as transformers. As shown, a first bus 310 is coupled to the first synchronous generator 302, a second bus 312 is coupled to the second synchronous generator 304, a third bus 316 is coupled to the third synchronous generator 308, and a fourth bus 314 is coupled to the fourth synchronous generator 306. As shown, a load 326, 328, 330, 332 is coupled to each bus 310, 312, 314, 316. In some embodiments, the loads 326, 328, 330, 332 may be constant impedance loads and/or induction motors. As shown, the example microgrid 300 is a 13.8-kilovolt (kV) microgrid with a total generating capacity of 225 megawatts (MW).

To apply the MPC formulation above, the synchronous machines (e.g., generators) may be modeled using a "1.1 model" without stator transients. While a reduced order model is discussed below, it should be understood that a more detailed machine model(s) (e.g., a "2.2 model") may be used in the MPC. The differential equations for the 1.1 model are:

$$T'_{do}\frac{d}{dt}E'_q = -E'_q - (X_d - X'_d)I_d + E_{fd}, \quad (25)$$

$$T'_{qo}\frac{d}{dt}E'_d = -E'_d + (X_q - X'_q)I_q, \quad (26)$$

$$\frac{d}{dt}\delta = \omega_s(\omega - 1), \quad (27)$$

$$2H\frac{d}{dt}\omega = T_m - E'_d I_d - E'_q I_q - (X'_q - X'_d)I_d I_q. \quad (28)$$

All variables are per unit (pu), and $\omega_s$ is the synchronous frequency. The rotor angle $\delta$ (not the perturbation operator) may be defined with respect to a common synchronously rotating reference frame. The variables $I_q$ and $I_d$ are the stator currents injected into the network and are constrained by the algebraic network equations. The field winding voltage $E_{fd}$ and the mechanical torque $T_m$ of Equations (25)-(28) may be inputs to the dynamic model of the synchronous machine. Linearizing the system dynamics $f_{sm}(x_{sm}, u_{sm}, I_{qd,sm})$ yields:

$$\frac{d}{dt}\delta x_{sm} = \frac{\partial f_{sm}}{\partial x_{sm}}\delta x_{sm} + \frac{\partial f_{sm}}{\partial I_{qd,sm}}\delta I_{qd,sm} + \frac{\partial f_{sm}}{\partial T_m}\delta T_m + \frac{\partial f_{sm}}{\partial E_{fd}}\delta E_{fd}, \quad (29)$$

where $x_{sm}^T = [E'_q\ E'_d\ \delta\ \omega]$, $u_{sm}^T = [T_m\ E_{fd}]$, and $I_{qd,sm}^T = [I_q\ I_d]$. The rotor field winding current $I_{fd}$ is a linear function of states and stator currents. Thus, $$\delta I_{fd} = \frac{\partial I_{fd}}{\partial x_{sm}}\delta x_{sm} + \frac{\partial I_{fd}}{\partial I_{qd,sm}}\delta I_{qd,sm}. \quad (30)$$

Figure 5:
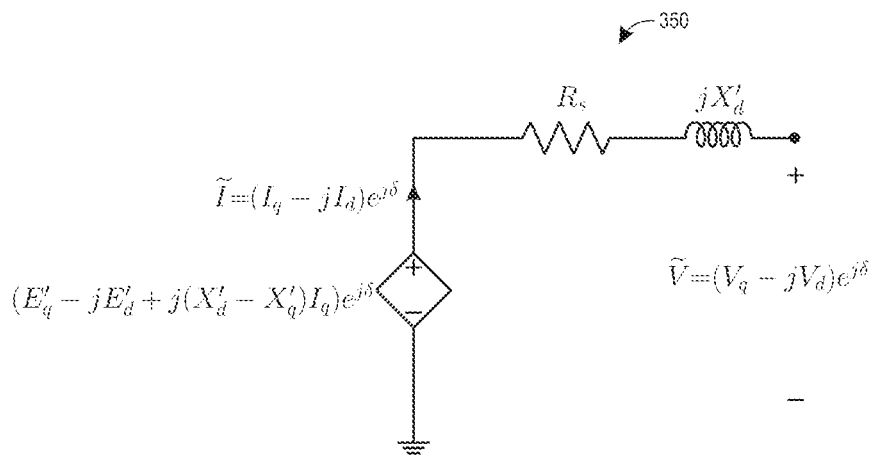
FIG. 5 is a circuit diagram for an example voltage-behind-transient-reactance circuit, according to an embodiment of the present disclosure.
Figure 6:
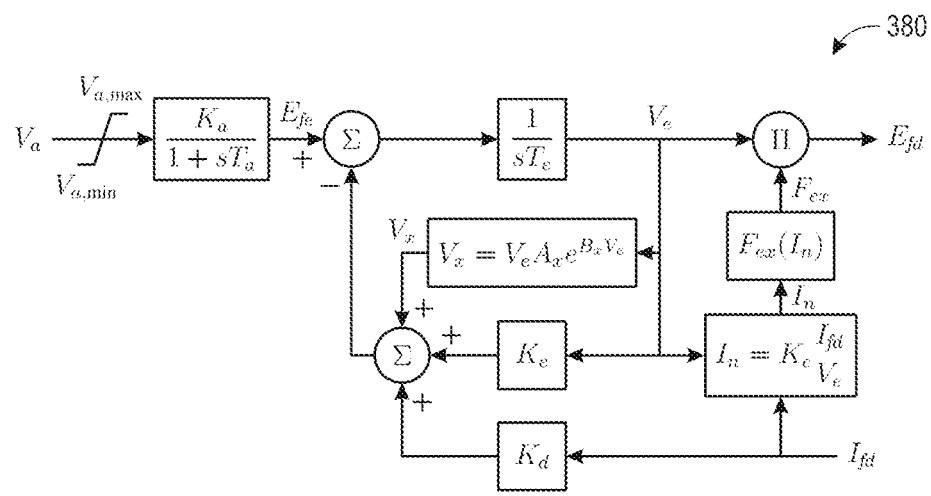
FIG. 6 is a block diagram of an example brushless excitation system, according to an embodiment of the present disclosure.

FIG. 5 is a circuit diagram for an example voltage-behind-transient-reactance (VBR) circuit 350, according to an embodiment of the present disclosure. The VBR circuit 350 may be representative of algebraic stator-side equations of the microgrid 300, discussed with respect to FIG. 4. FIG. 6 is a block diagram of an example brushless exciter 380, according to an embodiment of the present disclosure. In some embodiments, the field winding voltage of the exciter alternator $E_{fe}$ may be controlled via a power amplifier circuit (e.g., with a digital excitation system), represented by a first-order transfer function.

The input voltage signal, $V_a$, may be determined by the MPC. The limits on $V_a$ may be accounted for in the controller using the constraints of Equation (20). The state $V_e$ represents the voltage of the exciter 3-phase winding, which may be supplied to the rotating rectifier. The exciter dynamics are nonlinear due to saturation effects and may be dependent on the field winding current of the main alternator $I_{fd}$. The rectifier modes of operation may be captured by the following piecewise function:

$$f_{ex}(I_n) = \begin{cases} 1 - \frac{\sqrt{3}}{3}I_n, & 0 \le I_n \le \frac{\sqrt{3}}{4} \\ \sqrt{\frac{3}{4} - (I_n)^2}, & \frac{\sqrt{3}}{4} < I_n \le \frac{3}{4} \\ \sqrt{3}(1 - I_n), & \frac{3}{4} < I_n \le 1 \\ 0, & 1 < I_n \end{cases} \quad (31)$$

Linearizing the exciter dynamics $f_{exc}(x_{exc}, u_{exc})$ yields $$\frac{d}{dt}\delta x_{exc} = \frac{\partial f_{exc}}{\partial x_{exc}}\delta x_{exc} + \frac{\partial f_{exc}}{\partial V_a}\delta V_a + \frac{\partial f_{exc}}{\partial I_{fd}}\delta I_{fd}, \quad (32)$$

where $x_{exc}^T = [V_e\ E_{fe}]$ and $u_{exc}^T = [V_a\ I_{fd}]$. The exciter model outputs $E_{fd} = h_{exc}(x_{exc}, u_{exc}) = V_e F_{ex}$. After algebraic manipulations, $$\delta E_{fd} = \left(F_{ex}^* - I_n^* \frac{\partial F_{ex}}{\partial I_n}\right)\delta V_e + K_o \frac{\partial F_{ex}}{\partial I_n}\delta I_{fd}. \quad (33)$$

Evaluating Equation (33) for the k-th interval of the prediction period 272, it may be assumed that the exciter remains in the same mode of operation as predicted in the nonlinear simulation of Equations (1)-(3).

Figure 7:
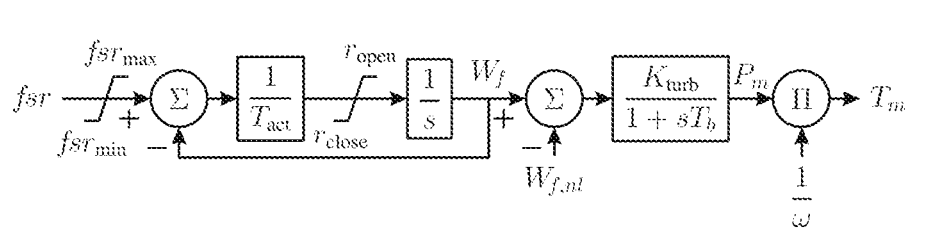
FIG. 7 is a block diagram of a gas and/or steam turbine model used in a model predictive control (MPC), in accordance with an embodiment of the present disclosure.

FIG. 7 is a block diagram of a gas and/or steam turbine model 400 used in a model predictive control (MPC), in accordance with an embodiment of the present disclosure. The model 400 may be representative of a simplified gas or steam turbine (with selection of proper parameters). The MPC may provide a reference fsr (e.g., fuel stroke demand) for a position of an actuator valve that controls a fuel flow $W_f$. The model 400 includes nonlinear slew rate limiters that limit a speed in which the actuator valve opens and/or closes. Conversion of the fuel into mechanical output power $P_m$ by the turbine model 400 is modeled by a first-order transfer function. Mechanical torque $T_m$ applied to a shaft of the synchronous machine may be determined by dividing the mechanical power by the rotor speed. Linearizing the turbine dynamics $f_{turb}(x_{turb}, u_{turb})$ yields $$\frac{d}{dt}\delta x_{turb} = \frac{\partial f_{turb}}{\partial x_{turb}}\delta x_{turb} + \frac{\partial f_{turb}}{\partial fsr}\delta fsr, \quad (34)$$

where $x_{turb}^T=[W_f, P_m]$ and $u_{turb}^T=[fsr\ \omega]$. The turbine model outputs $T_m = h_{turb}(x_{turb}, u_{turb}) = P_m/\omega$. Thus, $$\delta T_m = T_m^*\left(\frac{\delta P_m}{P_m^*} - \frac{\delta \omega}{\omega^*}\right). \quad (35)$$

Limits on the fsr may be added to the MPC as constraints as in Equation (20). In some cases, the slew rate limiters in the turbine model may be ignored in computing the Jacobian matrices of Equation (34). However, impact of the slew rate limiters may be accounted for using the following constraints:

$$fsr - W_f \leq T_{act} r_{open} \mathbb{J}_{N_c} \quad (36)$$

$$-(fsr - W_f) \leq -T_{act} r_{close} \mathbb{J}_{N_c}, \quad (37)$$

where $\mathbb{J}_{N_c}$ is a column vector of ones (1's). The vectors fsr and $W_f$ may contain the turbine input and fuel flows for each time step of the control period (e.g., fsr is a permutation of U). A procedure similar to that discussed with respect to Equations (4)-(11) to obtain $$\delta W_f = L \delta fsr \quad (38)$$

where L is a lower triangular matrix. Substitution yields trajectory-linearized inequality constraints of the form of Equation (15):

$$\begin{bmatrix} \mathbb{I}_{N_c} - L \\ L - \mathbb{I}_{N_n} \end{bmatrix} \delta fsr \leq \begin{bmatrix} T_{act} r_{open} \mathbb{J}_{N_c} - (fsr^* - W_f^*) \\ -T_{act} r_{close} \mathbb{J}_{N_c} + (fsr^* - W_f^*) \end{bmatrix}. \quad (39)$$

Figure 8:
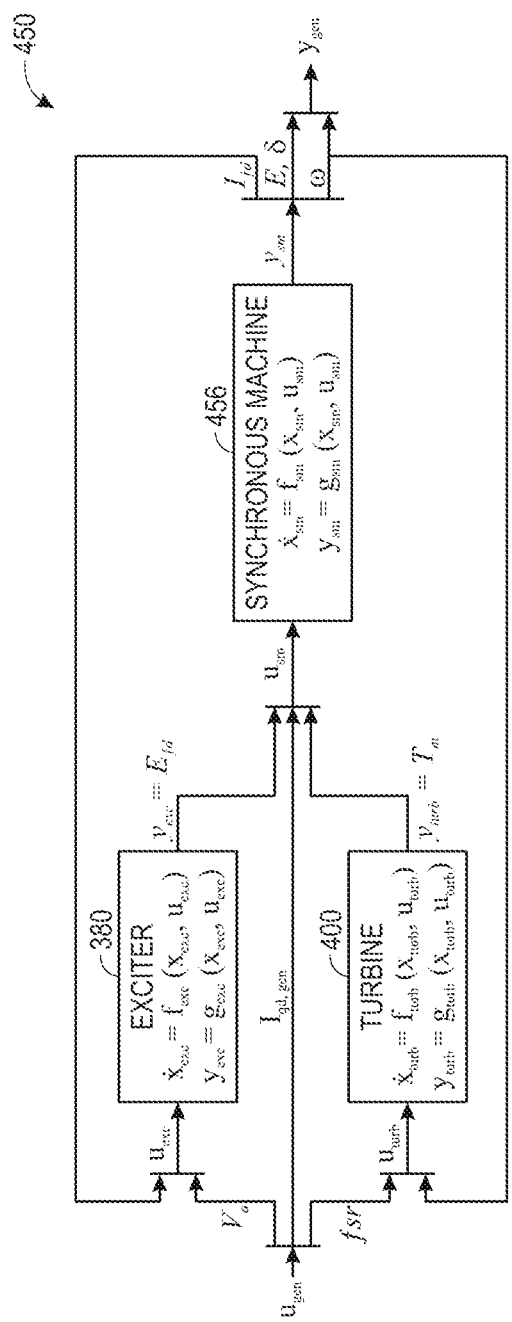
FIG. 8 is a block diagram of an example synchronous generator model used in the MPC, according to an embodiment of the present disclosure.

FIG. 8 is a block diagram of an example synchronous generator model 450 used in the MPC, according to an embodiment of the present disclosure. The synchronous generator model 450 includes the exciter model 380 of FIG. 6, the turbine model 400 of FIG. 7, and a synchronous machine 456. Linearized dynamics of the synchronous machine 456 of Equation (29), the exciter 380 of Equation (32), and the turbine 400 of Equation (34) may be combined in the general form of Equation (27), where:

$$x_{gen} = [x_{sm}^T, x_{exc}^T, x_{turb}^T]^T, u_{gen} = [V_a, fsr]^T, \quad (40)$$

as shown in FIG. 8.

For the constant impedance portion of the loads 326, 328, 330, 332 of FIG. 4, an admittance of each load 326, 328, 330, 332 may be added to a bus admittance matrix of the network. The induction machine models may consist of nonlinear differential algebraic equations similar to the synchronous machine models. An induction machine model may be used in the MPC formulation consisting four state variables (e.g., two for rotor flux linkages and two for mechanical dynamics) and an algebraic VBR circuit similar to FIG. 5. The rotor windings of the induction machines may be assumed to be short-circuited and the mechanical load torque may be represented as a quadratic function of rotor speed. Similar to Equation (29) for the synchronous machine model, dynamics for the induction motors may be written in the form:

$$\dot{x}_{im} = f_{im}(x_{im}, u_{im}, I_{qd,im}) \quad (41)$$

where $$x_{im} = [E_q', E_d', \delta, \omega]^T \quad (42)$$

$$u_{im} = T_m \quad (43)$$

$$I_{qd,im} = [I_q, I_d]^T. \quad (44)$$

The power system network may be modeled without electromagnetic transients in the network components. Admittances of, for example, transmission lines, circuit breakers, transformers, etc., constant impedance loads, and VBR machine models in the microgrid 300 may be combined into a bus admittance matrix, $\tilde{Y}$. An impedance part of the VBR models 350 for the synchronous and induction machines may be added to the bus admittance matrix. For the synchronous generator VBR models 350, the dependent voltage source may include sub-transient saliency terms that contain a q-axis stator current. For example, the qd-axis stator currents for the synchronous and induction machines may be expressed as a nonlinear algebraic function of the system states.

The stator currents for the r machines may be given by the nonlinear, complex algebraic equation:

$$(\mathbb{I}_r - j\tilde{Y}S)T(x)I_q - jT(x)I_d - \tilde{Y}T(x)E(x) = 0, \quad (45)$$

where $I_q^T = [I_{q,1} \ldots I_{q,r}]$, $I_d^T = [I_{d,1} \ldots I_{d,r}]$, $S \in \mathbb{R}^{r \times r}$ is a constant diagonal matrix that accounts for rotor saliency, $T(x) = \text{diag}\{[e^{j\delta_1} \ldots e^{j\delta_r}]\}$ is the rotor reference frame transformation, and the VBR voltage sources are:

$$E(lx) = [E_{q,1}' - jE_{d,1}' \ldots E_{q,r}' - jE_{d,r}']^T. \quad (46)$$

Linearizing Equation (45) about the point $(x_k^*, I_{qd,k}^*)$ yields:

$$M_q \delta I_q + M_d \delta I_d + M_x \delta x = 0, \quad (47)$$

where $M_q = (\mathbb{I}_r - j\tilde{Y}S)T(x_k^*)$, $M_d = -jT(x_k^*)$, and $$M_x = (\mathbb{I}_r - j\tilde{Y}S)\text{diag}\{I_{q,k}^*\}\frac{\partial T}{\partial x} - \\ j\text{diag}\{I_{d,k}^*\}\frac{\partial T}{\partial x} - \tilde{Y}T(x_k^*)\frac{\partial E}{\partial x} - \tilde{Y}\text{diag}\{E(x_k^*)\}\frac{\partial T}{\partial x}. \quad (48)$$

Equation 47 is split into real and imaginary parts, to obtain a sensitivity of the stator currents to system states, $\partial g/\partial x$, which appears in the Jacobian matrices $A_k$ and $C_k$ of Equation (7).

To ensure system stability, a proper selection of output values is needed. Presented herein are three types of short-term instability in AC microgrids: (1) transient (rotor angle) stability, (2) frequency stability, and (3) voltage stability. Transient instability may occur when rotors of synchronous machines lose synchronism. In one embodiment, to capture this phenomenon, differences in rotor speed of each generator may be examined with respect to a center-of-inertia (COI) speed (e.g., an inertia weighted average of rotor speed). If a rotor speed of a particular generator diverges from the COI speed, transient stability may have been lost.

Similarly, frequency instability may occur when a COI frequency of a generator diverges from a desired system frequency (e.g., 60 Hz) as defined by Equation (50) below. Voltage instability may occur when a magnitude of system bus voltage exceed a minimum limit or a maximum limit. These quantities may be captured in the MPC objective function for the microgrid 300 of FIG. 4 using:

$$y = [\hat{\omega}_1 \ldots \hat{\omega}_4 \ \omega_{COI} \ |V_1| \ \ldots \ |V_4|]^T, \quad (49)$$

$$\hat{\omega}_g = \omega_g - \omega_{COI}, \omega_{COI} = \frac{\sum_{g=1}^{4} H_g \omega_g}{\sum_{g=1}^{4} H_g}, \quad (50)$$

$$|V_i| = \sqrt{V_{q,i}^2 + V_{d,i}^2} = h_{vi}(x, I_{qd}), \quad (51)$$

where $H_g$ is an inertia constant (e.g., in seconds) of generator g, Wo is a rotor speed of generator g, and $V_{q,i}$ and $V_{d,i}$ are qd-axis voltages at bus i. The VBR synchronous machine model may be used to express the voltage magnitude $h_{vi}$ as a function of generator states and currents. The Jacobian matrix $C_k$ in Equation (7) includes terms that are obtained by Equation (50) and linearizing Equation (51).

The reference output vector $Y_{ref}$ in Equation (12) may be set such that all terms associated with w of Equations (49)-(51) are 0 (e.g., over the prediction period), terms associated with $\omega_{COI}$ may be one (e.g., 1) per unit, and terms associated with |V| may be set to pre-fault voltage magnitudes determined by an optimal (e.g., acceptable, good, best) power flow (OPF) calculation. The weights in Q may be tuned to balance the desired importance of transient stability, frequency stability, voltage stability, and maintaining a steady-state operating point. The controlled inputs to the system are:

$$u = [fsr_1 V_{a,1} \ldots fsr_4 V_{a,4}]^T. \quad (52)$$

Figure 9:
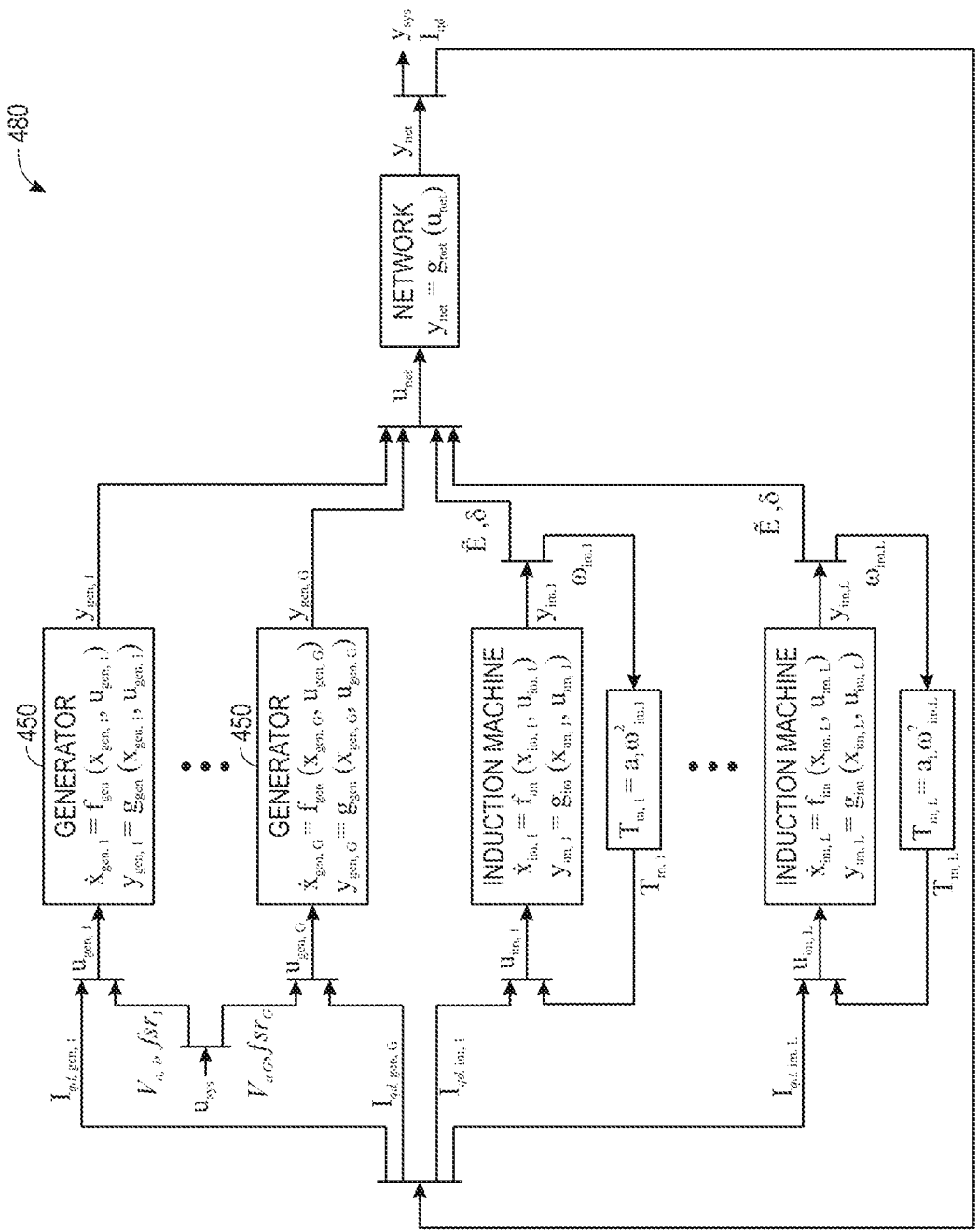
FIG. 9 is a block diagram of an example system model for the microgrid of FIG. 4, according to an embodiment of the present disclosure.

FIG. 9 is a block diagram of an example system model 480 for the microgrid 300 of FIG. 4, according to an embodiment of the present disclosure. The system model 480 may be generated by combining the dynamic models of the synchronous generators 450 of FIG. 8 and induction machines (discussed with respect to FIG. 8 above) with the network model and system outputs. Despite the complexity of this system, Jacobian matrices such as those in Equation (7) may be computed for each MPC time step by making a few simplifications.

First, to address the piece-wise nature of the expression for $E_{fd}$ in the brushless exciter model 380, it may be assumed that a mode of operation of the exciter does not change within the MPC time step for the linearization. Second, the slew rate limiters in the turbine model 400 were not included in computing the Jacobian matrices. However, the MPC may compensate for impacts caused by the slew rate limiters by using linear inequality constraints associated with the fuel stroke demand fsr to discourage the MPC from changing the fsr too quickly. Details of computing these Jacobian matrices are not included for brevity. However, it should be understood that any technique for computing Jacobian matrices, including the techniques above for computing the Jacobian matrices of Equation (7), could be used.

Figure 10A:
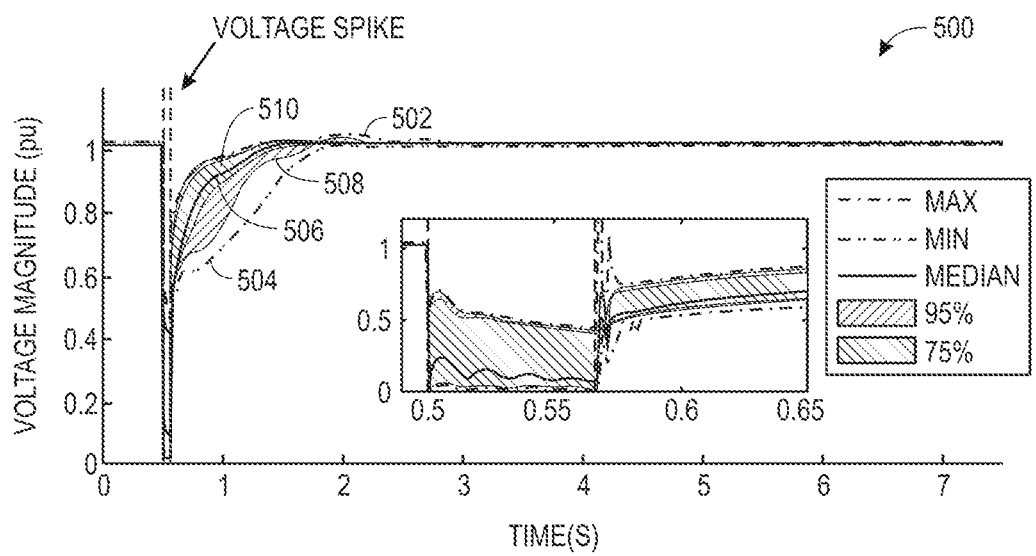
FIG. 10A is a graph illustrating voltage magnitude profiles for all buses of the delivery system using the MPC discussed herein, according to an embodiment of the present disclosure.

FIGS. 10A-11C illustrate example simulation results using an MPC as discussed herein for various faults in a microgrid, such as the microgrid 300 discussed with respect to FIG. 3. As discussed below, the faults used for the simulation occur at various locations in the microgrid 300. FIGS. 10A-10C are based on data from all buses and generators of the microgrid 300. As shown, all bus voltages are similar due to the relatively short line lengths of, for example, the lines 320A, 320B, 322A, 322B, 324A, and 324B. Voltage spikes may appear in FIGS. 10A-10C at the time (e.g., the instant, moment, etc.) when the fault is cleared due to snubbers in the circuit breaker models.

Figure 10B:
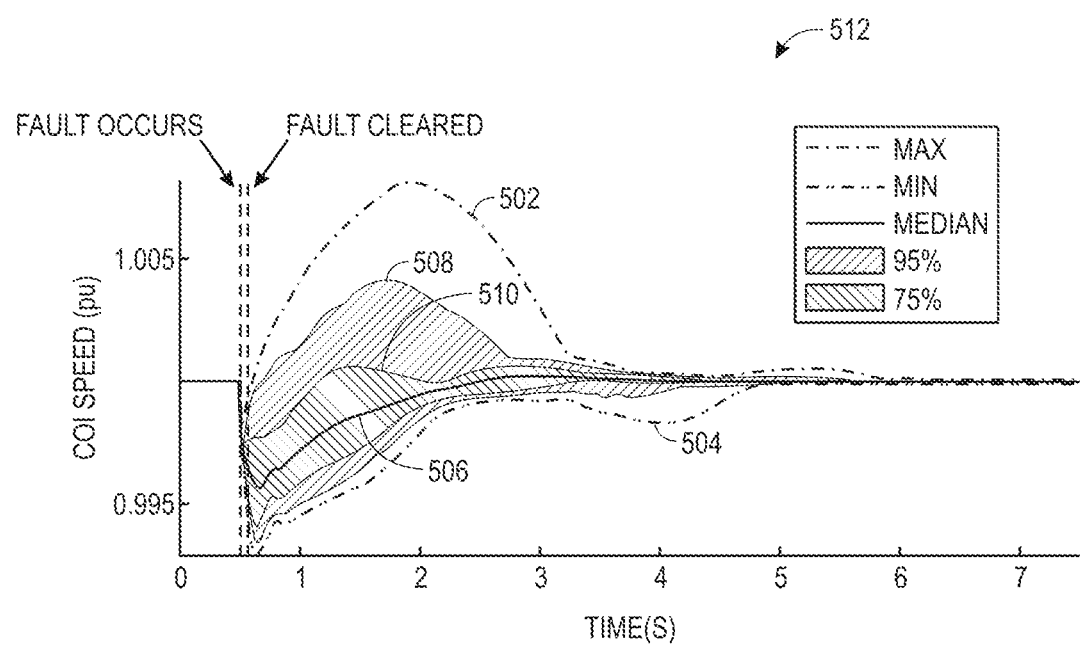
FIG. 10B is a graph illustrating a center-of-inertia (COI) speed profile of the delivery system using the MPC discussed herein, according to an embodiment of the disclosure.
Figure 10C:
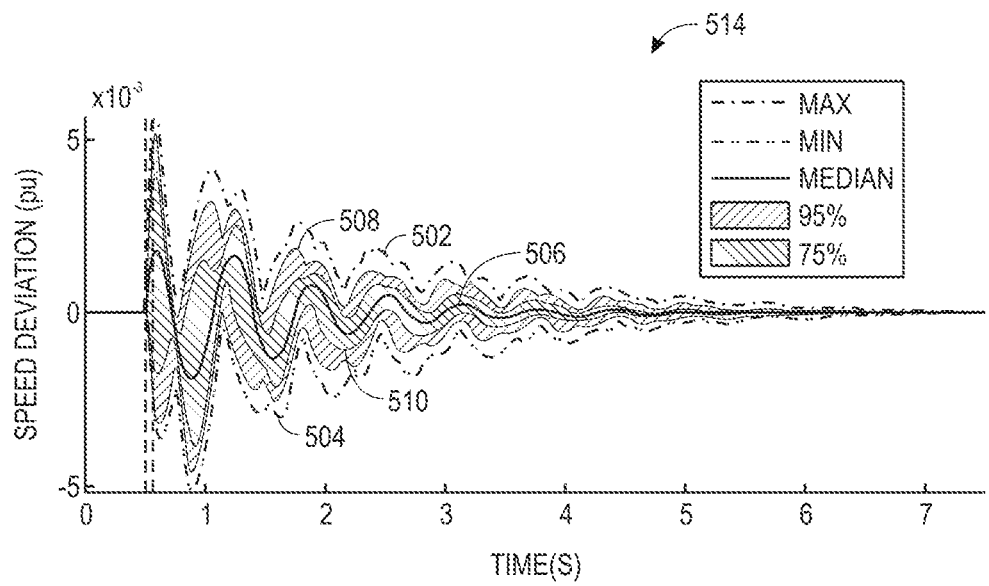
FIG. 10C is a graph illustrating a rotor speed deviation profile of the delivery system using the MPC, according to an embodiment of the present disclosure.

FIG. 10A is a graph 500 illustrating voltage magnitude profiles for all buses of the delivery system using the MPC discussed herein, according to an embodiment of the present disclosure. FIG. 10B is a graph 512 illustrating a center-of-inertia (COI) speed profile of the delivery system using the MPC discussed herein, according to an embodiment of the disclosure. FIG. 10C is a graph 514 illustrating a rotor speed deviation profile of the delivery system using the MPC, according to an embodiment of the present disclosure.

As shown, the graphs 500, 512, and 514 include a voltage magnitude profile for a maximum voltage magnitude 502, a minimum voltage magnitude 504, a median voltage magnitude 506, a 95% prediction interval 508, and a 75% prediction interval 510. The MPC stabilizes system voltages and frequencies relatively quickly in each of FIGS. 10A-10C.

In some cases, operating conditions with heavily loaded induction motors near the fault may exhibit the worst performance, resulting in prolonged voltage sags and larger frequency deviations. The MPC performs well under all conditions, recovering system voltages within seconds and limiting frequency excursions to less than 1%.

Figure 11A:
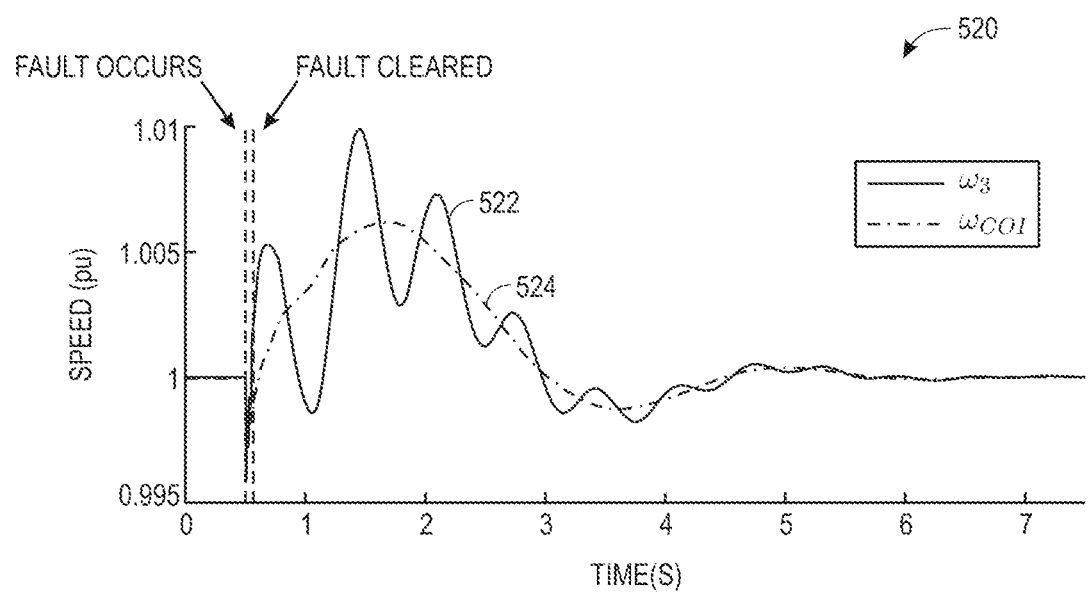
FIG. 11A is a graph illustrating a center-of-inertia (COI) speed and a generator rotor speed in response to a fault on a corresponding bus of the delivery system using the MPC discussed herein, according to an embodiment of the present disclosure.
Figure 11B:
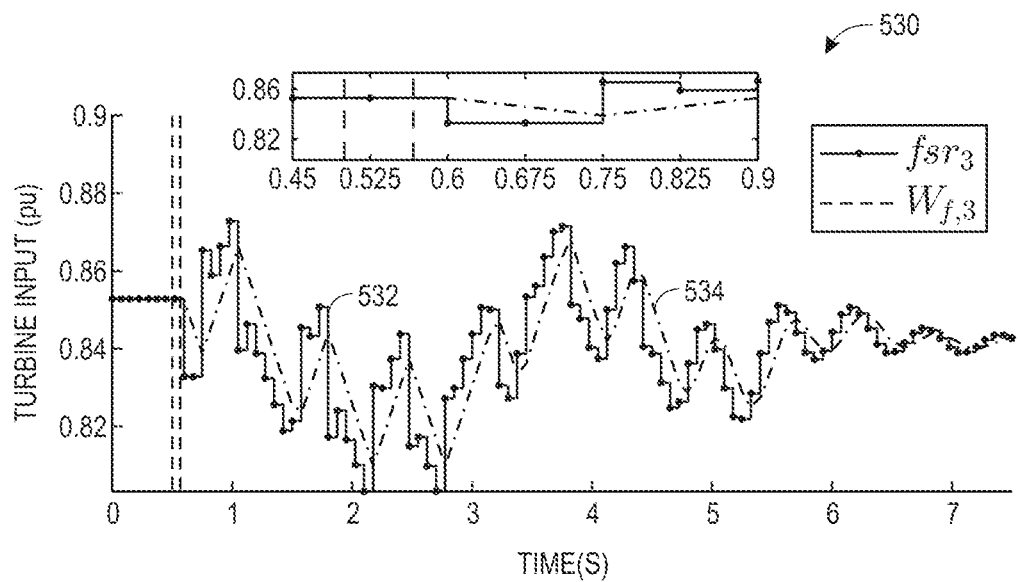
FIG. 11B is a graph illustrating a turbine input command and turbine fuel flow for the generator discussed with respect to FIG. 11A, according to an embodiment of the present disclosure.
Figure 11C:
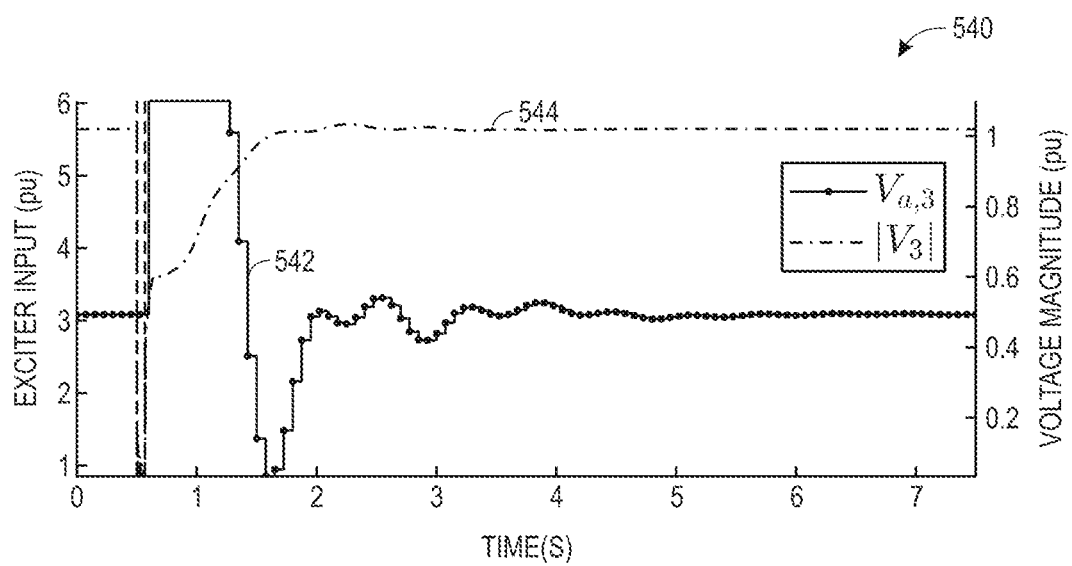
FIG. 11C is a graph illustrating an exciter input and bus voltage magnitude of the generator discussed with respect to FIGS. 11A and 111B, according to an embodiment of the present disclosure.

FIGS. 11A-11C are based on data from the third synchronous generator 308. However, it should be understood that other generators in the microgrid may have similar responses. Further, as discussed above, the microgrid 300 is merely used as an example and it should be understood that different and/or additional components or a different microgrid topology may be used.

FIG. 11A is a graph 520 illustrating a center-of-inertia (COI) speed and a generator rotor speed in response to a fault on a corresponding bus of the delivery system using the MPC discussed herein, according to an embodiment of the present disclosure. FIG. 11B is a graph 530 illustrating a turbine input command and turbine fuel flow for the generator discussed with respect to FIG. 11A, according to an embodiment of the present disclosure. FIG. 11C is a graph 540 illustrating an exciter input and bus voltage magnitude of the generator discussed with respect to FIGS. 11A and 111B, according to an embodiment of the present disclosure. For each of FIGS. 11A-11C, the graphs 520, 530, 540 illustrate responses for frequency ($\omega$) 522, center-of-inertia (COI) frequency ($\omega_{COI}$) 524, input voltage signal ($V_a$) 542, and the absolute value of the generator voltage $V_3$ 544.

When the fault occurs (t=0.5 s), the voltage magnitude drops suddenly (FIG. 11C) and the generator rotor speed initially falls, but then accelerates quickly (FIG. 11A). At t=0.525 s, which is the first sampling point after occurrence of the fault, the MPC obtains knowledge of the fault from relays. The MPC updates the bus admittance matrix (e.g., the fault is modeled internally as a pure short-circuit to ground) and computes the optimal input. Due to delays, these control actions may be simulated as starting at the next sampling time, t=0.6 s, which is after the fault is cleared at t=0.5667 s. At t=0.6 s, one or more relays inform the MPC the fault is cleared and the admittance matrix is updated again to reflect the opening of faulted line (e.g., line 324B). The MPC predicts the future drop in voltage magnitude and increase in rotor speed following the fault and responds by increasing the exciter input, $V_a$, to its upper limit (FIG. 11c) and decreasing fsr (FIG. 11b). In general, the MPC decreases fsr from t=0.6 s to t=2.7 s when the COI frequency is high. However, during this interval, fsr is periodically increased as the rotor speed of the generator (e.g., the third generator 308 oscillates around the COI speed. The MPC respects turbine slew rate limits while adjusting the fsr.

The MPC presented herein improves response to a disturbance in a microgrid by utilizing power system models and real-time measurements of the microgrid from state observers and relays to provide a system-level perspective.

Further, the MPC predicts a dynamic response of the system to disturbances rather than relying on a reactive feedback loop, tuning of which may be difficult and resource intensive. The MPC presented herein improves short-term frequency and voltage stability in microgrids. The trajectory linearization techniques discussed herein enables use of nonlinear component dynamic models in a real-time (or near real-time) implementation. In doing so, the trajectory linearization techniques provides an approach to solving complex, nonlinear power system dynamic models that is computationally efficient compared to other approaches.

As discussed above, the MPC control signals may be used to control inputs of a synchronous generator. In some embodiments, the MPC control signals may be used to control distributed energy resources (e.g., an inverter), inverter interfaced resources (e.g., power generated via solar, wind, batteries, or any combination thereof), control decisions such as load shedding, opening and/or closing circuit breakers and/or relays, and the like. To do so, these resources and/or components may be modeled via nonlinear differential algebraic equations similar to Equations (1)-(3) with state variables and inputs. Similar techniques regarding predictions, linearization, and determining real-time control input data may be used to achieve a desired output response.

It should be understood that the microgrids and associated components presented herein are merely examples and that the techniques presented herein may be applied to microgrids with more and/or fewer components and microgrids with additional and/or alternative components than those discussed herein. It should also be understood that the calculations and computations presented herein are merely example applications of the disclosed techniques and that fewer, additional, and/or alternative calculations and computations may be used to determine a change in an output of the components of the microgrid based on a change to the inputs of the components of the microgrid.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method comprising:
   obtaining, by a controller of a microgrid, input data associated with one or more states of a generator, a load, and an equipment of a microgrid before a sampling period;
   obtaining, by the controller, a first input trajectory of the input data for each time step of a plurality of time steps of the sampling period;
   predicting, by the controller, a trajectory of an output of the microgrid based at least in part on the first input trajectory, for each time step of the plurality of time steps;
   linearizing, by the controller, for each time step of the plurality of time steps, the trajectory of the output;
   obtaining, by the controller, output data on a bus for each time step of the plurality of time steps, wherein the bus is coupled to the generator, the load, and the equipment of the microgrid;
   determining, by the controller, a deviation of the output data from the linearized trajectory of the output;
   determining, by the controller, a first change in the linearized trajectory of the output in a first time step of the plurality of time steps based on the deviation;
   determining, by the controller, an updated input trajectory based at least in part on the linearized trajectory of the output and mapping the first change to a second change in the first input trajectory of a subsequent time step of the plurality of time steps; and
   reducing, by the controller, a voltage oscillation on the bus caused by the deviation between a first threshold and a second threshold by adjusting at least one state of the one or more states of at least one of the generator, the load, and the equipment of the microgrid based on the updated input trajectory.

2. The method of claim 1, wherein the first input trajectory is based on the updated input trajectory from a previous sampling period.

3. The method of claim 1, wherein the sampling period is less than one second.

4. The method of claim 1, wherein at least a portion of the input data is associated with a voltage and a frequency of the bus.

5. The method of claim 1, wherein a time duration to obtain the input data, obtain the first input trajectory, predict the trajectory of the output, linearize the trajectory of the output, and determine the updated input trajectory is less than the sampling period.

6. The method of claim 1, wherein the input data is associated with an inverter interfaced resource including at least one of a solar generator, a wind generator, and a battery.

7. The method of claim 1, wherein a plurality of states of the microgrid during the sampling period, the updated input trajectory during the sampling period, and the output of the microgrid during the sampling period are represented by nonlinear differential equations.

8. The method of claim 7, wherein linearizing, by the controller, the trajectory of the output is based on a trajectory of the at least one state.

9. A power delivery system comprising:
   a generator configured to generate electrical power;
   a load coupled to the generator and configured to consume the electrical power;

one or more sensors configured to monitor at least one of the generator and the load; and a controller coupled to the generator, the load, and the one or more sensors, the controller including a model predictive controller configured to:
- obtain input data from the one or more sensors associated with one or more states of the generator, the load, and an equipment of the power delivery system before a sampling period;
- obtain a first input trajectory of the input data for each time step of a plurality of time steps of the sampling period;
- predict a trajectory of an output of the power delivery system based at least in part on the first input trajectory, for a prediction period;
- linearize, for the prediction period, the trajectory of the output;
- obtain output data on a bus for each time step of the plurality of time steps, wherein the bus is coupled to the generator, the load, and the equipment;
- determine a deviation of the output data from the linearized trajectory of the output;
- determine a first change in the linearized trajectory of the output in a first time step of the plurality of time steps based on the deviation;
- determine an updated input trajectory based at least in part on the linearized trajectory of the output and mapping the first change to a second change in the first input trajectory of a subsequent time step of the plurality of time steps; and
- reduce a voltage oscillation on the bus between a first threshold and a second threshold by adjusting at least one state of the one or more states of at least one of the generator, the load, and the equipment of the power delivery system based on the updated input trajectory.

10. The power delivery system of claim 9, wherein the first input trajectory is the updated input trajectory from a previous sampling period.

11. The power delivery system of claim 9, wherein a duration of the sampling period is less than one second.

12. The power delivery system of claim 9, wherein the input data is associated with a voltage and a frequency of the bus.

13. The power delivery system of claim 9, wherein a time duration to obtain the input data, obtain the first input trajectory, predict the trajectory of the output, linearize the trajectory of the output, and determine the updated input trajectory is less than the sampling period.

14. The power delivery system of claim 9, wherein the input data is associated with an inverter interfaced resource.

15. The power delivery system of claim 9, wherein the linearized trajectory of the output is indicative of a trajectory of the at least one state for each time step of the plurality of time steps.

16. The power delivery system of claim 15, wherein determining the first change in the linearized trajectory of the output is based on a change in the trajectory of the at least one state in the first time step.

17. The power delivery system of claim 9, wherein adjusting the at least one state comprises adjusting a voltage, a frequency, a rotor speed, a mechanical torque of at least one of the generator, the load, and the equipment.

18. A system, comprising:
- an electrical power generator comprising an exciter and a turbine;
- a load coupled to the electrical power generator;
- one or more sensors coupled to the electrical power generator and the load, the one or more sensors configured to monitor the exciter, the turbine, and the load and obtain input data associated with one or more states of the exciter, the turbine, and the load, and output data associated with the exciter, the turbine, and the load on a bus, wherein the bus is coupled to the electrical power generator and the load; and
- a controller coupled to the electrical power generator, the load, and the one or more sensors, the controller including a model predictive controller configured to:
  - obtain the input data and the output data from the one or more sensors before a sampling period;
  - obtain a first input trajectory based on the input data for each time step of a plurality of time steps of the sampling period;
  - predict a trajectory of the output data based at least in part on the first input trajectory for each time step of the plurality of time steps;
  - linearize, for each time step of the plurality of time steps, the trajectory of the output data;
  - obtain the output data for each time step of the plurality of time steps;
  - determine a deviation of the output data from the linearized trajectory of the output data;
  - determine a first change in the linearized trajectory of the output data in a first time step of the plurality of time steps based on the deviation;
  - determine an updated input trajectory based at least in part on the linearized trajectory of the output data by mapping the first change in the linearized trajectory of the output data to a second change in the first input trajectory of a subsequent time step of the plurality of time steps; and
  - reduce a voltage oscillation on the bus between a first threshold and a second threshold by adjusting at least one state of the one or more states of at least one of the exciter, the turbine, and the load of the system based on the updated input trajectory.

19. The system of claim 18, wherein a duration of the sampling period is between about 20 milliseconds and about 100 milliseconds.

20. The system of claim 18, wherein the input data is associated with a voltage and a frequency of the at least one of the exciter, the turbine, and the load.

* * * * *